(12) United States Patent
Roberge

(10) Patent No.: US 11,149,645 B2
(45) Date of Patent: *Oct. 19, 2021

(54) THERMAL MANAGEMENT OF A SHAFT

(71) Applicant: Raytheon Technologies Corporation, Farmington, CT (US)

(72) Inventor: Gary D. Roberge, Tolland, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 347 days.

This patent is subject to a terminal disclaimer.

(21) Appl. No.: 16/426,260

(22) Filed: May 30, 2019

(65) Prior Publication Data

US 2020/0378307 A1    Dec. 3, 2020

(51) Int. Cl.
*F02C 7/18*    (2006.01)
*F02C 7/36*    (2006.01)

(52) U.S. Cl.
CPC ............... *F02C 7/185* (2013.01); *F02C 7/36* (2013.01)

(58) Field of Classification Search
CPC .... F02C 7/18; F02C 7/185; F02C 7/36; F16C 3/16; F01D 25/125; F01D 25/12; F01D 5/02; F01D 5/085
See application file for complete search history.

(56) References Cited

U.S. PATENT DOCUMENTS

| | | | |
|---|---|---|---|
| 3,453,825 A | 7/1969 | May et al. | |
| 5,144,794 A * | 9/1992 | Kirikami | F01D 5/081 415/115 |
| 10,018,116 B2 * | 7/2018 | Ackermann | F01D 5/085 |
| 2008/0306115 A1 | 12/2008 | Cheng | |
| 2016/0312703 A1 * | 10/2016 | Ribarov | F02C 9/18 |
| 2016/0312711 A1 | 10/2016 | Suciu et al. | |
| 2018/0306115 A1 * | 10/2018 | Motsch | F02C 7/18 |
| 2019/0003335 A1 | 1/2019 | Evans et al. | |
| 2019/0368419 A1 * | 12/2019 | Roberge | F02C 7/18 |
| 2020/0011247 A1 * | 1/2020 | Schwarz | F02C 7/185 |

FOREIGN PATENT DOCUMENTS

WO    2017144207 A1    8/2017

OTHER PUBLICATIONS

European Search Report for European Application No. 20177297.7 dated Oct. 22, 2020.

* cited by examiner

*Primary Examiner* — Steven M Sutherland
*Assistant Examiner* — Rodolphe Andre Chabreyrie
(74) *Attorney, Agent, or Firm* — Carlson, Gaskey & Olds, P.C.

(57) ABSTRACT

A gas turbine engine includes a fan, a compressor section, a combustor, and a turbine section where the turbine section is downstream of the combustor section. A shaft connects the turbine section to the compressor section. A bore tube is disposed within the shaft downstream of the compressor section. The bore tube includes an inlet connected to an air source for passing cooling air in an upstream direction of the shaft.

18 Claims, 3 Drawing Sheets

THERMAL MANAGEMENT OF A SHAFT

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section.

Shafts are utilized to transmit torque from the turbine section to drive fan and compressor sections. Increased engine efficiencies enable smaller core engine sections that transmit increasing amounts of power and produce increased amounts of heat. Engine shafts that are located within hotter sections of the engine encounter temperatures that challenge material capabilities.

Turbine engine manufacturers continue to seek further improvements to engine performance including improvements to thermal and propulsive efficiencies.

SUMMARY

A gas turbine engine according to an exemplary embodiment of this disclosure includes, among other possible things, a fan, a compressor section, a combustor, and a turbine section where the turbine section is downstream of the combustor section. A shaft connects the turbine section to the compressor section. A bore tube is disposed within the shaft downstream of the compressor section. The bore tube includes an inlet connected to an air source for passing cooling air in an upstream direction of the shaft.

In a further embodiment of the foregoing gas turbine engine, the shaft includes an aft end and the inlet of the bore tube is disposed at the aft end of the shaft.

In a further embodiment of any of the foregoing gas turbine engines, a cooling air supply conduit and a rotating seal to seal between the cooling air supply conduit and the bore tube is included.

In a further embodiment of any of the foregoing gas turbine engines, the bore tube is spaced radially apart from an inner surface of the shaft defining an annular passage therebetween.

In a further embodiment of any of the foregoing gas turbine engines, an end cap is at an upstream end of the bore tube. The end cap defines an air seal preventing airflow in an upstream direction.

In a further embodiment of any of the foregoing gas turbine engines, the bore tube includes an outlet at the upstream end that communicates airflow into the annular passage.

In a further embodiment of any of the foregoing gas turbine engines, the upstream end extends upstream past the turbine section.

In a further embodiment of any of the foregoing gas turbine engines, the shaft includes an outlet forward of the aft end and aft of the upstream end. The outlet is in communication with the annular passage for exhausting cooling air.

In a further embodiment of any of the foregoing gas turbine engines, a retaining ring at the aft end of the shaft supports the bore tube and blocks air flow in the annular passage from exiting the aft end of the shaft.

In a further embodiment of any of the foregoing gas turbine engines, an aft bearing supports an aft end of the shaft. The bearing is disposed within a bearing chamber and the retaining ring sealing the annular passage at the bearing chamber to prevent lubricant from entering the annular passage.

In a further embodiment of any of the foregoing gas turbine engines, the bore tube comprises a sealed tube having an outlet at an upstream location forward of the turbine section.

In a further embodiment of any of the foregoing gas turbine engines, a gear reduction is positioned between the fan section and a fan drive turbine of the turbine section.

In a further embodiment of any of the foregoing gas turbine engines, the air source comprises an air cycle machine.

In a further embodiment of any of the foregoing gas turbine engines, the air source comprises a conduit in communication with the compressor section.

In a further embodiment of any of the foregoing gas turbine engines, a heat exchanger cools the air from the air source prior to introduction into the bore tube.

A gas turbine engine, according to an exemplary embodiment of this disclosure includes, among other possible things, a fan rotor, a compressor section, a combustor and a turbine section. The turbine section includes a fan drive turbine downstream of the combustor section. A shaft connects the fan drive turbine section to the fan rotor. The shaft includes an inner cavity and an aft end. A means to supply cooling air within the inner cavity of the shaft is included to pass cooling air from the aft end to an upstream location and communicate the cooling air within an annular passage that is in communication with an inner surface of the inner cavity.

In a further embodiment of the foregoing gas turbine engine, the means for supplying cooling air includes a tube with an upstream opening disposed within the inner cavity of the shaft. The tube is spaced apart from the inner surface of the inner cavity to define a portion of the annular passage.

In a further embodiment of any of the foregoing gas turbine engines, the means for supplying cooling air includes a conduit in communication with a cooling airflow positioned outside of a core engine including the compressor section, the combustor and the turbine section.

A method of operating a gas turbine engine according to an exemplary embodiment of this disclosure includes, among other possible steps, driving a fan rotor with a fan drive turbine in a turbine section through a shaft connecting the fan drive turbine to drive the fan rotor. The shaft includes an inner cavity open at an aft end. Cooling air is supplied to an inlet of a bore tube within the inner cavity of the shaft. The bore tube defines an inner passage from the aft end of the shaft to an upstream location and an annular passage between the bore tube an the inner cavity such that cooling airflow flows upstream from the aft end within the bore tube and into the annular passage to flow downstream to an outlet defined within the shaft.

In a further embodiment of the foregoing methods of operating a gas turbine engine, an upstream location forward of an upstream end of the shaft is sealed such that cooling air flow from the bore tube is directed downstream toward the aft end.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
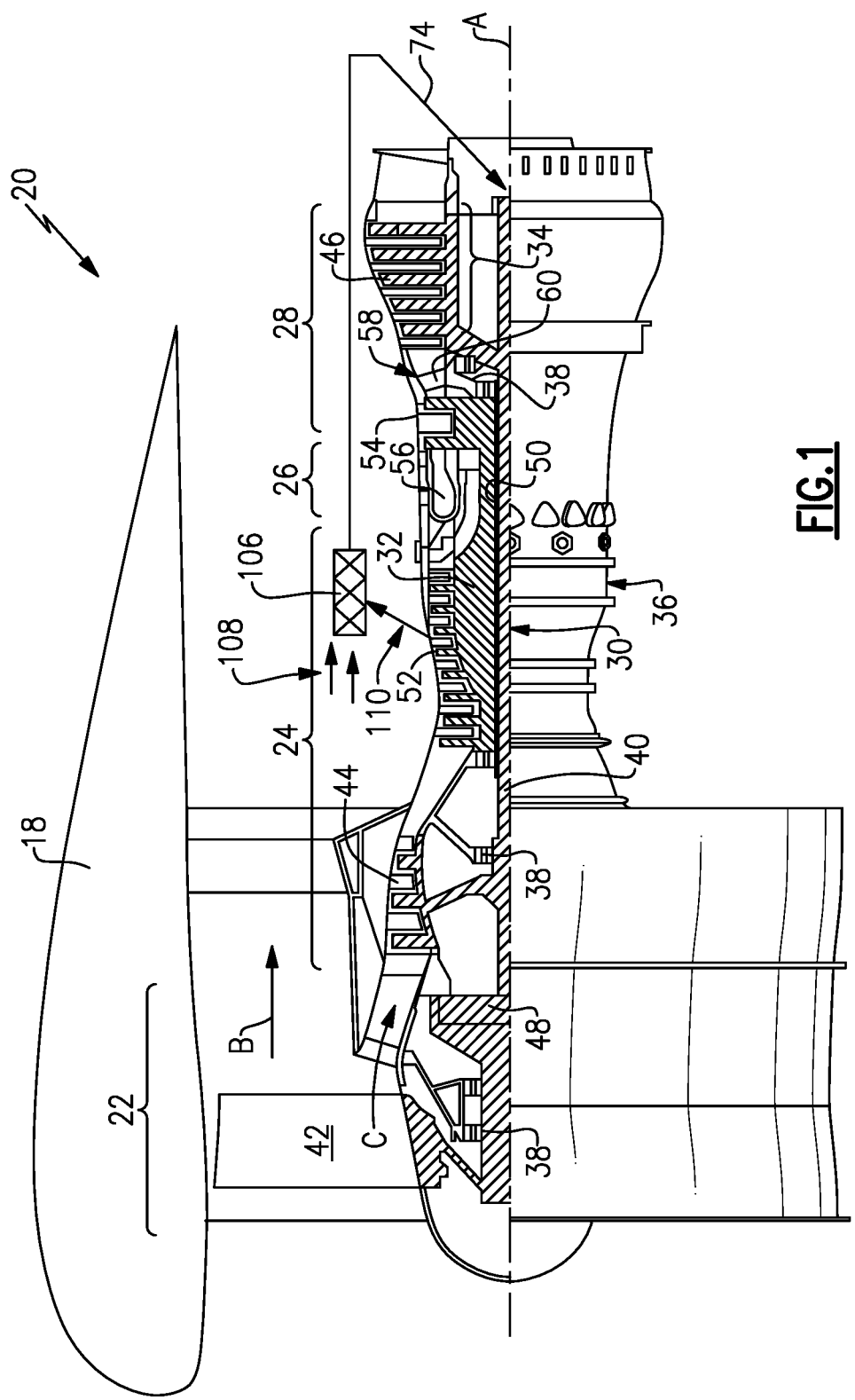
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives a bypass airflow 108 along a bypass flow path B in a bypass duct defined within a nacelle 18, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that the various bearing systems 38 may alternatively or additionally be provided at different locations and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to a fan section 22 through a speed change mechanism, which in exemplary gas turbine engine 20 is illustrated as a geared architecture 48 to drive fan blades 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor 44 and the fan blades 42 may be positioned forward or aft of the location of the geared architecture 48 or even aft of turbine section 28.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second (350.5 meters/second).

The example gas turbine engine includes the fan section 22 that comprises in one non-limiting embodiment less than about 26 fan blades 42. In another non-limiting embodiment, the fan section 22 includes less than about 20 fan blades 42. Moreover, in one disclosed embodiment the low pressure turbine 46 includes no more than about 6 turbine rotors schematically indicated at 34. In another non-limiting example embodiment, the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

The turbine section 28 operates at temperatures and pressures that require cooling. Air is tapped from a location 110 within the compressor section 24 and directed to locations within the turbine section 28 to provide a cooling airflow. The air bleed off from the compressor section 24 may be cooled within a heat exchanger 106. The example heat exchanger 106 is in an example of an air/air cooler that uses the bypass flow 108 to cool air tapped from the compressor location 110. The cooled cooling air is communicated to different locations within the turbine section 28 through at least one conduit schematically shown at 74. The cooling air is further spread to different turbine components for cooling.

Figure 2:
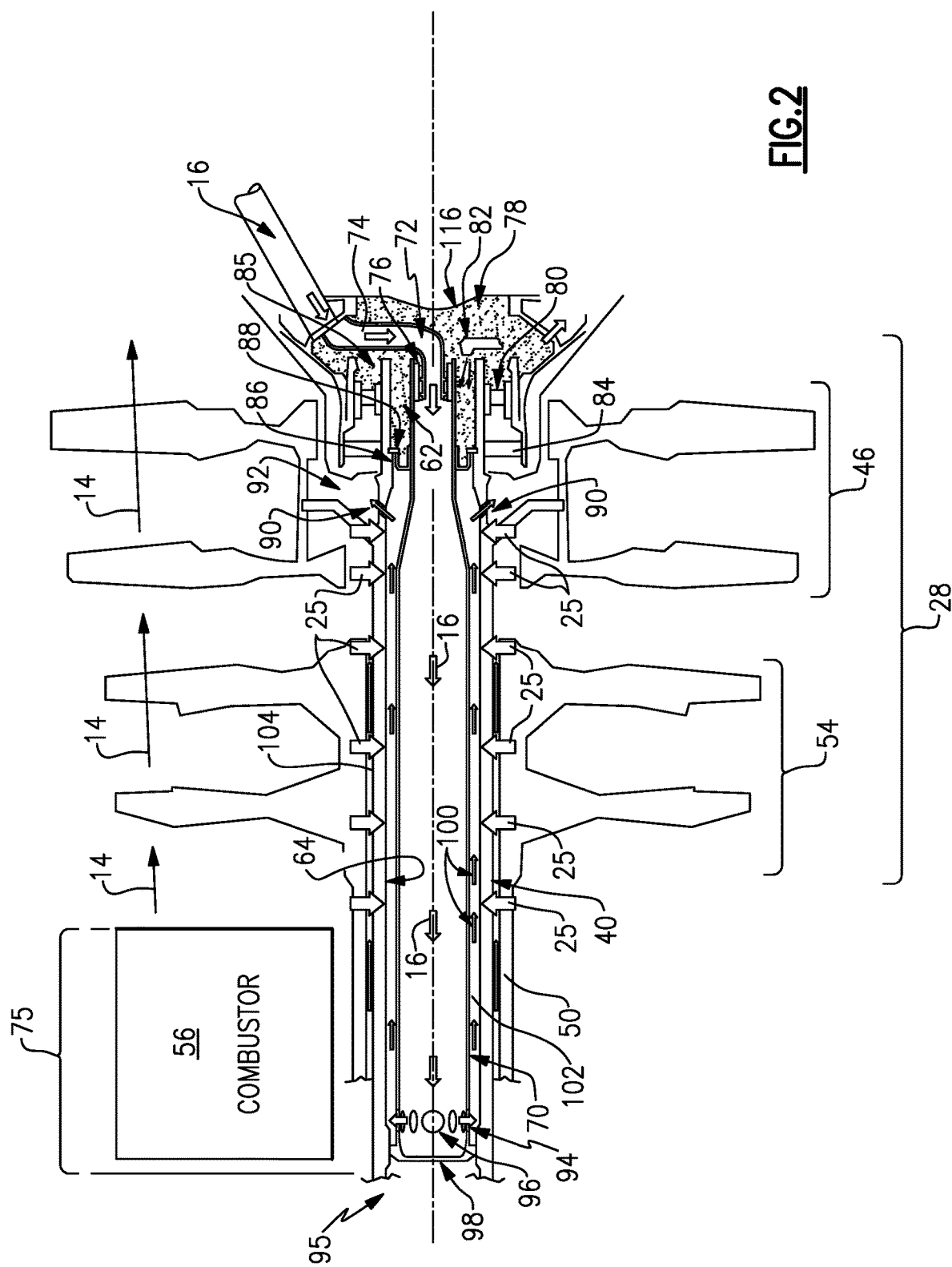
FIG. 2 is cross-sectional view of portion of an example turbine section.
Figure 3:
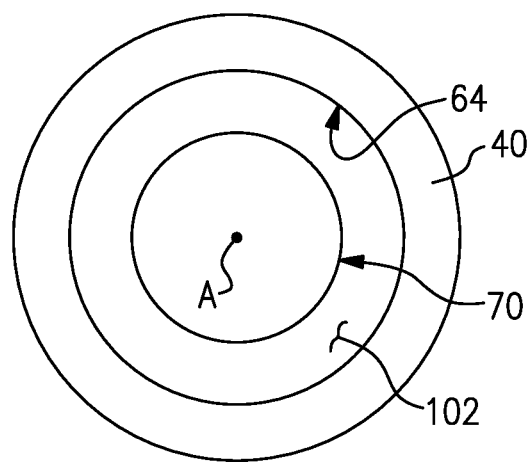
FIG. 3 is cross-sectional view through a portion of an example turbine shaft.

Referring to FIGS. 2 and 3 with continued reference to FIG. 1, the inner shaft 40 and the outer shaft 50 within the turbine section 28 are exposed to elevated temperatures. Work in the form of torque at a given rotational speed (RPM) is transmitted via the shaft between the low pressure turbine 46 and low pressure compressor 44 and fan 22. Shaft geometry is set using this torque by a combination of polar moment of inertia of the shaft (established by the dimension of inner and outer diameter) and available allowable material strength properties. For most alloys including steel and nickel alloys, allowable strength decreases with incremental increases in temperature resulting in a need for a thicker wall thickness (for a constant outer diameter) or increases in both inner and outer diameter to maintain the desired strength. This in turn results in a heavier shaft, possible secondary impacts on adjacent rotors as bore diameters are increased, and possible adverse impacts on shaft dynamics including critical speed. In order to reduce shaft temperature, cooling air flow 16 is communicated to an inner cavity 62 of the inner shaft 40 to remove heat schematically shown by arrows 25 produced by the high energy gas flow 14 generated by the combustor 56 and expanded through turbine section 28. Heat is also generated within the annular space 104 between the outer shaft 50 and the inner shaft 40. Moreover, some heat is also generated by a bearing system supporting an aft end of the inner shaft 40.

A bore tube 70 is positioned within the cavity 62 to direct cooling airflow 16 from an inlet 72 at an aft end 85 of the inner shaft 40 toward an upstream end 95 of the bore tube 70. The bore tube 70 is spaced radially apart from inner surface 64 of the cavity 62 to define a portion of an annular passage 102. The bore tube 70 is supported concentrically within the inner shaft by an aft seal 86 and by a cap 98 at the upstream end 95. The bore tube 70 communicates cooling airflow to select, targeted regions of the inner shaft 40 to maintain a desired maximum shaft temperature. In this example, the bore tube 70 extends axially forward of the high pressure turbine 54. In this example, a forward end of the bore tube 70 is disposed within an axial region 75 common with at least a portion of the combustor 56. The forward end of the bore tube 70 may be positioned at different axial locations to target cooling airflow at specific axial locations.

Cooling airflow 16 is communicated to the static inlet 72 of the rotating bore tube 70 and directed in an upstream direction toward the upstream end 95 to an outlet 94 of the bore tube 70. In this example, the bore tube 70 does not include cooling holes between the inlet 72 and the outlet 96. Cooling airflow 16 is therefore directed upstream axially toward radial holes 96 at the outlet 94. The radial holes 96 direct the cooling air 16 radially outward into the annular passage 102. Cooling air within the annular passage 102 is directed aft toward an outlet 90 defined in the inner shaft 40.

The outlet 90 is in communication with a low pressure region 92 to encourage airflow from the annular passage 102.

The annular passage 102 is of a size that places the cooling air flow 100 in thermal contact with the inner surface 64 of the inner shaft 40. The cooling air flow 100 within the annular passage 102 provides a convective cooling of the inner shaft 40 within the turbine section 28. For a given flow rate and temperature of cooling air flow 100, convective cooling can be affected by a number of means including setting the velocity of the cooling flow by setting the radial distance from bore tube 70 outer diameter to inner surface of the shaft 64. Additionally, cooling effectiveness can be further impacted by selective establishment of surface finish of inner surface 64 or by the introduction of features specifically intended to augment heat transfer.

The aft end of the inner shaft 40 is supported by bearings 80 disposed within a bearing compartment 78. The bearing compartment 78 includes a defined volume that is environmentally controlled including pressurization to prevent lubricant leakage. The static conduit 74 for cooling airflow extends through the compartment 78 but is not in communication with lubricant. Instead, an end of the static conduit 74 is provided with a rotating seal assembly 76 to maintain separation between the lubricant within the compartment 78 and cooling airflow 16 communicated to the bore tube 70. The bearing compartment 78 includes a seal 84 and an end cap 116 that hold lubricant within the defined volume. An oil jet 82 may be provided in the bearing compartment 78 to inject lubricant as needed.

The aft seal 86 is held in place by a retainer 88 to further prevent intrusion of lubricant into the annular passage 102. The aft seal 86 is provided downstream of the outlet 90 through the inner shaft 40. The aft seal 86 may also support the bore tube 70 to maintain the desired concentricity and radial spacing that defines the annular passage 12.

The end cap 98 is disposed near the outlet 94 and forward of the bore tube 70. The end cap 98 interacts with the low shaft 40 using a local tight fit which acts as a both a sealing surface and piloting feature and prevents the cooling airflow 16 exiting the radial holes 96 from flowing forward within the inner shaft 40. The end cap 98 seals against the inner surface 64 of the inner shaft. The cooling airflow 16 from within the bore tube 70 is directed aft within the annular passage as shown at 100 to accept heat from the shaft 40. A continuous but varying flow rate of cooling airflow 16, 100 is provided during engine operation to maintain the shaft 40 within a desired temperature range.

The bore tube 70 is fixed to the inner shaft 40 such that both the bore tube 70 and inner shaft rotate together. The conduit 74 is fixed relative to rotation of the bore tube 70. The rotating seal 76 provides for the communication of cooling airflow 16 between the fixed inlet 72 and the rotating bore tube 70. The rotating seal 76 maybe a knife edge seal, honeycomb seal, brush seal or any other seal configuration that provides for communication of airflow from the stationary conduit 74 to the rotating bore tube 70.

Figure 4:
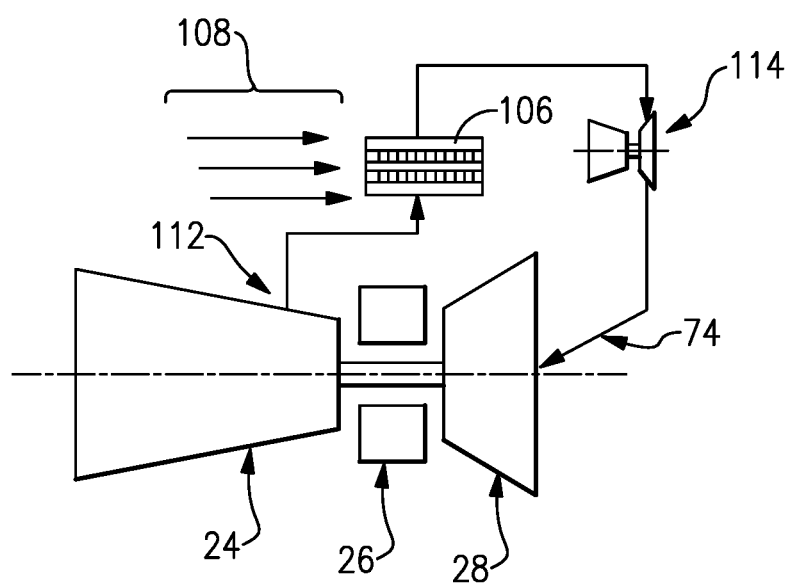
FIG. 4 is schematic view of an example gas turbine engine including an air-cycle machine.

Referring to FIG. 4 with continued reference to FIGS. 2 and 3, an air cycle machine 114 may be utilized to pressurize the cooling air flow 16 prior to communication to the bore tube 70. The air cycle machine 114 may be part of a thermal management system for the shaft 40 or part of another engine system providing cooling airflow. The example air cycle machine 114 provides for increasing of a pressure of the cooling airflow 16. Accordingly, bleed air maybe tapped from a location 112 in the compressor section 24 that is of pressure lower than is required by the bore tube 70. The lower pressure air tapped from the location 112 maybe of a lower temperature to accommodate higher heat loads. The air cycle machine 114 may be driven by another airflow, an electric motor or a mechanical connection.

Accordingly, the bore tube 70 defines the annular passage 102 within the inner shaft to remove heat and enable control of shaft temperatures within the hottest locations of the engine.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine comprising:
a fan, a compressor section, a combustor and a turbine section, the turbine section downstream of the combustor section;
a shaft connecting the turbine section to the compressor section;
a bore tube disposed within the shaft downstream of the compressor section, the bore tube including an inlet connected to an air source, the bore tube being spaced apart from an inner surface of the shaft defining an annular passage, wherein
the cooling air passes in an upstream direction of the shaft inside the bore tube and in a downstream direction inside the annular passages.

2. The gas turbine engine as recited in claim 1, wherein the shaft includes an aft end and the inlet of the bore tube is disposed at the aft end of the shaft.

3. The gas turbine engine as recited in claim 2, including a cooling air supply conduit and a rotating seal sealing between the cooling air supply conduit and the bore tube.

4. The gas turbine engine as recited in claim 3, including an end cap at an upstream end of the bore tube, the end cap defining an air seal preventing airflow in the upstream direction.

5. The gas turbine engine as recited in claim 4, wherein the bore tube includes an outlet at the upstream end that communicates airflow into the annular passage.

6. The gas turbine engine as recited in claim 5, wherein the shaft includes an outlet forward of the aft end and aft of the upstream end, the outlet is in communication with the annular passage for exhausting the cooling air.

7. The gas turbine engine as recited in claim 5, including a retaining ring at the aft end of the shaft supporting the bore tube and blocking the cooling air in the annular passage from exiting the aft end of the shaft.

8. The gas turbine engine as recited in claim 7, including an aft bearing supporting an aft end of the shaft, the bearing disposed within a bearing chamber and the retaining ring sealing the annular passage at the bearing chamber preventing lubricant from entering the annular passage.

9. The gas turbine engine as recited in claim 4, wherein the upstream end extends upstream past the turbine section.

10. The gas turbine engine as recited in claim 1, wherein the bore tube comprises a sealed tube having an outlet at an upstream location forward of the turbine section.

11. The gas turbine engine as recited in claim 1, wherein a gear reduction is positioned between the fan section and a fan drive turbine of the turbine section.

12. The gas turbine engine as recited in claim 1, wherein the air source comprises an air cycle machine.

13. The gas turbine engine as recited in claim 1, wherein the air source comprises a conduit in communication with the compressor section.

14. The gas turbine engine as recited in claim 1, including a heat exchanger for cooling air from the air source prior to introduction into the bore tube.

15. A gas turbine engine comprising:
a fan rotor, a compressor section, a combustor and a turbine section, the turbine section including a fan drive turbine downstream of the combustor section;
a shaft connecting the fan drive turbine section to the fan rotor, the shaft including an inner cavity and an aft end; and
a means for supplying cooling air within the inner cavity of the shaft
the means for supplying air having a tube within the inner cavity for passing cooling air from the aft end to an upstream location and communicating the cooling air within an annular passage in communication with an inner surface of the inner cavity and passes the cooling air from the upstream location towards the aft end in the annular passage, wherein
the tube has an upstream opening disposed within the inner cavity, and is spaced apart from the inner surface of the inner cavity to define the annular passage.

16. The gas turbine engine as recited in claim 15, wherein said means for supplying cooling air includes a conduit in communication with a cooling airflow positioned outside of a core engine including the compressor section, the combustor and the turbine section.

17. A method of operating a gas turbine engine comprising the steps of:
driving a fan rotor with a fan drive turbine in a turbine section through a shaft connecting the fan drive turbine to drive the fan rotor, wherein the shaft includes an inner cavity open at an aft end; and
supplying cooling air to an inlet of a bore tube within the inner cavity of the shaft, the bore tube defining an inner passage from the aft end of the shaft to an upstream location and an annular passage between the bore tube an the inner cavity such that cooling airflow flows upstream from the aft end within the bore tube and into the annular passage to flow downstream to an outlet defined within the shaft.

18. The method as set forth in claim 17, including the sealing of an upstream location forward of an upstream end of the shaft such that cooling air flowed from the bore tube is directed downstream toward the aft end.

* * * * *